United States Patent
Eckardt et al.

(10) Patent No.: US 9,482,376 B2
(45) Date of Patent: Nov. 1, 2016

(54) PIPE ARRANGEMENT

(75) Inventors: Carsten Eckardt, Bruchkoebel (DE);
Peter Hartmann, Aschaffenburg (DE);
Oliver Strauss, Nidderau (DE); Peter Foltyn, Leingarten (DE)

(73) Assignee: NORMA GERMANY GMBH, Maintal (DE)

( * ) Notice: Subject to any disclaimer, the term of this patent is extended or adjusted under 35 U.S.C. 154(b) by 599 days.

(21) Appl. No.: 13/166,400

(22) Filed: Jun. 22, 2011

(65) Prior Publication Data

US 2011/0315299 A1   Dec. 29, 2011

(30) Foreign Application Priority Data

Jun. 23, 2010 (DE) .................. 10 2010 024 691

(51) Int. Cl.
| F16L 47/02 | (2006.01) |
| F16L 33/34 | (2006.01) |
| B29C 65/06 | (2006.01) |
| B29C 65/00 | (2006.01) |
| B29L 31/00 | (2006.01) |

(52) U.S. Cl.
CPC ............ *F16L 33/34* (2013.01); *B29C 65/0672* (2013.01); *B29C 66/12441* (2013.01); *B29C 66/322* (2013.01); *B29C 66/342* (2013.01); *B29C 66/5344* (2013.01); *B29C 66/972* (2013.01); *F16L 47/02* (2013.01); *B29L 2031/737* (2013.01); *F16L 2201/10* (2013.01)

(58) Field of Classification Search
USPC .......... 285/288.1, 288.5, 328, 330–332, 924
See application file for complete search history.

(56) References Cited

U.S. PATENT DOCUMENTS

| 1,179,552 | A | * | 4/1916 | Nelson .......................... 285/257 |
| 2,284,216 | A | * | 5/1942 | Kunkel ......................... 285/331 |
| 4,679,827 | A | * | 7/1987 | Law ............................ 285/151.1 |
| 4,775,170 | A | * | 10/1988 | Usui et al. ...................... 285/24 |
| 4,869,533 | A | | 9/1989 | Lehmann et al. |
| 6,199,916 | B1 | | 3/2001 | Klinger et al. |
| 6,902,208 | B1 | * | 6/2005 | Mobley et al. ............... 285/331 |
| 7,429,064 | B2 | * | 9/2008 | Topolsek et al. .......... 285/151.1 |
| 7,806,444 | B2 | | 10/2010 | Blivet et al. |
| 2005/0127668 | A1 | | 6/2005 | Mobley et al. |
| 2008/0012309 | A1 | | 1/2008 | Blivet et al. |

FOREIGN PATENT DOCUMENTS

| DE | 36 04 923 | 12/1986 |
| DE | 102008006068 | 6/2009 |
| FR | 2872084 | 12/2005 |

(Continued)

OTHER PUBLICATIONS

German Office Action dated Feb. 1, 2011 conducted in counterpart German Application No. 10 2010 024 691.3-24 with partial English language translation.

(Continued)

*Primary Examiner* — Aaron Dunwoody
*Assistant Examiner* — Fannie Kee
(74) *Attorney, Agent, or Firm* — Greenblum & Bernstein, P.L.C.

(57) ABSTRACT

A pipe arrangement includes a pipe and a pipe coupling having on a front face a peripheral groove with a groove bottom. The pipe is insertable within the groove and weldable to the pipe coupling. At least one through opening structured and arranged to connect the groove to the surroundings of the pipe coupling.

12 Claims, 1 Drawing Sheet

(56) References Cited

FOREIGN PATENT DOCUMENTS

| | | |
|---|---|---|
| JP | 58-125789 | 8/1983 |
| JP | 63-067494 | 3/1988 |
| JP | 07-301374 | 11/1995 |
| JP | 08-142231 | 6/1996 |
| JP | 09-210280 | 8/1997 |
| JP | 11-270771 | 10/1999 |
| JP | 2002-504980 | 2/2002 |
| JP | 2002-192622 | 7/2002 |
| JP | 2002-228080 | 8/2002 |
| JP | 2004-100765 | 4/2004 |
| JP | 2008-164108 | 7/2008 |
| WO | 2009/148318 | 12/2009 |

OTHER PUBLICATIONS

European Search Report/Office Action conducted in counterpart European Application No. 11005185.1 (Mar. 26, 2012).
Japanese Office Action conducted in counterpart Japanese Appln. No. 2011-138141 (Jan. 15, 2013) (with English language translation).
Korean Office action conducted in counterpart Korean Appln. No. 10-2011-0060761 (Mar. 28, 2013) (w/ English language translation).
German Office Action conducted in counterpart German Appln. No. 10 2010 024 691.3 (May 22, 2014).
China Office action conducted in counterpart China Appln. No. 201110170473.2 (Jul. 1, 2015) (w/ English language translation).

* cited by examiner

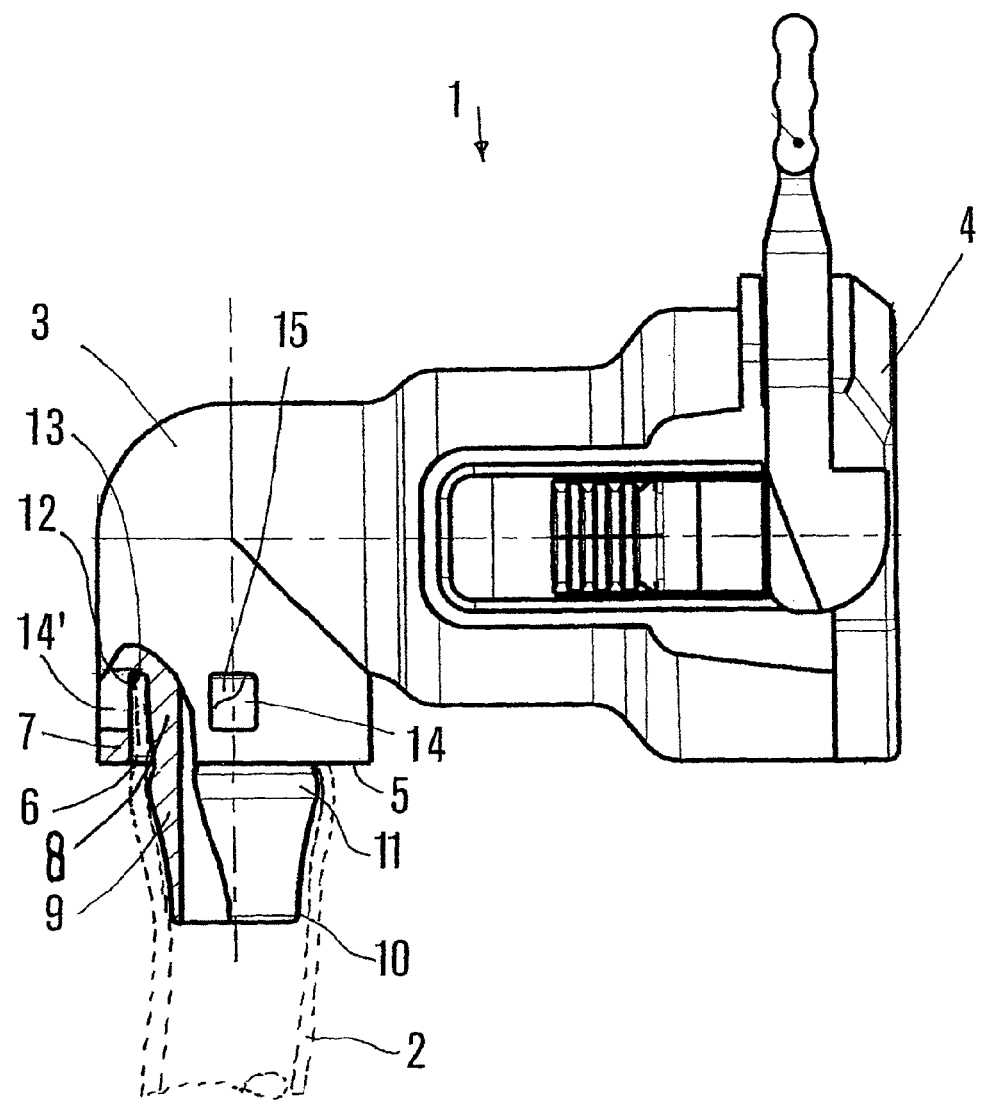

PIPE ARRANGEMENT

CROSS-REFERENCE TO RELATED APPLICATIONS

The present application claims priority under 35 U.S.C. §119 of German Patent Application No. DE 10 2010 024 691.3, filed on Jun. 23, 2010, the disclosure of which is expressly incorporated by reference herein in its entirety.

BACKGROUND OF THE INVENTION

1. Field of the Invention

The invention relates to a pipe arrangement with a pipe and a pipe coupling. The pipe coupling has on a front face a peripheral groove with a groove bottom. The pipe is inserted into the peripheral groove and welded with the pipe coupling.

2. Discussion of Background Information

A pipe arrangement of the type generally described above is widespread, particularly in vehicle manufacturing. For example, the pipe is used to transport a fuel from a fuel container to a fuel consumer, e.g., an injection pump supplying an internal combustion engine. To facilitate the assembly, as well as later repairs, the pipe is connected to a pipe coupling firmly and, as a rule, permanently. The pipe coupling can then come into engagement with a corresponding pipe connection, in the cited example, on the tank or on the injection pump. To this end the pipe connection is often inserted into the pipe coupling and snapped there.

In order to produce the connection between the pipe and the pipe coupling, the pipe is inserted into the groove on the front face of the pipe coupling and welded there. For welding, so-called friction welding is often used, in which the pipe coupling is rotated in the groove with respect to the pipe. The frictional heat thereby produced melts the material of the pipe and/or the pipe coupling so that a connection by adhesive force between the pipe and the pipe coupling results.

However, it has been established that in some cases the quality of the welded joint between the pipe and the pipe coupling is not adequate. This often cannot be detected immediately after the production of the pipe arrangement, but is shown only after a certain operating period. Under unfavorable circumstances it can be observed that the fluid flowing through the pipe arrangement leaks out between the pipe coupling and the pipe, which is not admissible in many cases.

SUMMARY OF THE INVENTION

Embodiments of the invention ensure a high quality of the welded joint between the pipe and the pipe coupling.

Accordingly, a pipe arrangement of the type mentioned at the outset additionally provides a groove connected to the surroundings of the pipe coupling via at least one through opening.

Therefore, the groove is connected via the through opening either to the outside of the pipe coupling, i.e., to the ambient air, or to the interior of the pipe coupling, that is, to the region through which the fluid flowing through the pipe arrangement later flows.

Although the opening reduces the region in which the pipe and the pipe coupling, i.e., the inside of the groove, can come into contact with one another, the through opening makes it possible for enclosed air to escape between the pipe coupling and the rotating pipe during friction welding. In this manner, the production of vacuoles in the region of the welded joint is prevented. The welded joint achieves a better quality, leaks are avoided, and the risk of weakening the welded joint is reduced.

Preferably, the opening starts from a weld region between the pipe and the pipe coupling. It can thus be ensured with great reliability that the air enclosed between the pipe and the pipe coupling does not negatively affect the weld region, but can escape to the outside by means of the through opening.

Preferably, the opening penetrates the groove bottom at least in part. The aim is to have the friction welded joint between the pipe and the pipe coupling take place on the groove bottom, that is, between the front face of the pipe and the groove bottom. It can namely be ensured here in an advantageous manner that the front face of the pipe and the groove bottom are pressed against one another with a certain force, so that the high temperature required for friction welding can be reached relatively quickly. When the opening penetrates the groove bottom, at least in part, it is ensured that the air that is located there during a rotation of the pipe with respect to the pipe coupling is conveyed to the through opening and can escape there.

Preferably, the groove is embodied or formed between a radially inner wall and a radially outer wall and the opening is embodied or formed in one of the walls. This facilitates production. The walls that delimit the groove are generally easily accessible. The opening then needs only to penetrate a relatively thin material thickness. If the pipe coupling is embodied or formed as an injection molded part, then the opening can be produced during the injection molding.

It is preferred hereby for the opening to be embodied or formed in the radially outer wall. This means that the interior of the pipe coupling is left unchanged and designs previously used and optimized can continue to be used for the interior of the pipe coupling.

It is hereby preferred for the opening to overlap the groove bottom or to conclude therewith. This is a simple way of ensuring that the weld zone is connected to the groove bottom.

Preferably, the opening has a length and a cross section in which the smallest extension of the cross section is at least as large as the length of the opening. This is a simple yet effective manner of reducing the risk of the opening closing so far during welding that air can no longer escape.

Preferably, the opening has a rectangular cross section. The opening thus has a certain extension in the circumferential direction of the groove, namely also on the groove bottom. This keeps the risk low of the opening already closing in the immediate vicinity of the groove bottom.

Preferably, the opening with its longitudinal extension is aligned parallel to the longitudinal extension of the pipe in the groove. This facilitates shaping.

It is also advantageous if the opening is filled at least in part with melted-on material. If, for example, too much material has been melted on the front face of the pipe, a defined outflow for the melt via the opening results. This does not result in a narrowing of the interior cross section in the case of the pipe or the pipe coupling. Furthermore, a mechanical anchoring is produced, if the opening is filled with melt.

In general, it can be said that the opening is a good weld indicator. Welding processes that have been set up incorrectly can be visually recognized directly on the component without a destructive test. Inadmissibly short welded pipe arrangements can likewise be detected. An automatic inquiry would likewise be conceivable for subsequent processes, for example a depth measurement at the opening.

Embodiments of the invention are directed to a pipe arrangement. The pipe arrangement includes a pipe and a pipe coupling having on a front face a peripheral groove with a groove bottom. The pipe is insertable within the groove and weldable to the pipe coupling. At least one through opening structured and arranged to connect the groove to the surroundings of the pipe coupling.

According to embodiments, an edge of the at least one through opening can be arranged in a weld region between the pipe and the pipe coupling.

In accordance with other embodiments of the invention, the at least one through opening can penetrate the groove bottom at least in part.

According to further embodiments, the pipe arrangement may also include a radially inner wall and a radially outer wall arranged to form the groove, such that the at least one opening is formed in one of the walls. The at least one opening may be formed in the radially outer wall. Further, the at least one opening can one of overlap the groove bottom or end at the groove bottom.

In accordance with still other embodiments, the at least one opening has a length and a cross section. Further, a smallest extension of the cross section can be at least as large as the length of the at least one opening.

Moreover, the at least one opening can have a rectangular cross section. A longitudinal extension of the rectangular cross section may be aligned parallel to a longitudinal extension of the pipe in the groove.

According to other embodiments of the instant invention, the at least one opening may be filled at least in part with melted-on material.

Embodiments of the invention are directed to a method of forming a pipe arrangement. The method includes inserting a pipe into a groove formed in a front face of a pipe coupling up to a groove bottom, rotating the pipe in the groove and along the groove bottom relative to the pipe coupling to weld the pipe and pipe coupling together, and allowing air trapped between the pipe and the groove to escape through at least one opening in the pipe coupling communicating with the groove.

In accordance with embodiments of the invention, the method may further include viewing the proper seating of the pipe against the groove bottom through the at least one opening.

According to other embodiments, the method can include viewing the weld between the pipe and the pipe coupling through the at least one opening.

According to still other embodiments, the method may further include mechanically anchoring the pipe and pipe coupling by at least partially filling the at least one opening with melted material.

Embodiments of the invention are directed to a pipe coupling for receiving a pipe. The pipe coupling includes an outer annular wall, an inner annular wall, a groove formed between the inner and outer annular walls and extending to a groove bottom, and at least one opening formed in at least one of the inner and outer annular walls to communicate with the groove.

According to embodiments of the invention, the at least one opening can be arranged to communicate with the groove bottom.

In accordance with other embodiments of the instant invention, the inner annular wall can extend beyond the outer annular wall to form a pipe connection.

According to still other embodiments, the at least one opening may overlap the groove bottom.

In accordance with still yet other embodiments of the present invention, the at least one opening may have an edge aligned with the groove bottom.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The sole FIGURE illustrates a pipe arrangement, in part in open view.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The pipe arrangement 1 has a pipe 2 and a pipe coupling 3. Pipe 2 is shown here by broken lines in order to represent its course in pipe coupling 3, which for this purpose is shown partially in open view.

In a manner known per se, pipe coupling 3 has on one end a fastening geometry 4, with which it can be fastened to a coupling, not shown in further detail, for example by a catch mechanism.

Pipe coupling 3 has on the other end a peripheral groove 6 on a front face 5. Groove 6 is embodied or formed between a radially outer wall 7 and a radially inner wall 8. Radially inner wall 8 is extended in a pipe connection 9 onto which pipe 2 can be pushed. "Pipe" here does not mean only rigid pipes but also, for example, flexible pipes or hoses which can be pushed onto pipe connection 9. Pipe connection 9 has a tapering end 10 for this purpose, in order to facilitate the pushing on. Furthermore, a thickening 11 is provided, which produces an improvement in holding pipe 2 on pipe connection 9.

Groove 6 has a groove bottom 12, against which front face 13 of pipe 2 bears when pipe 2 has been inserted into groove 6. When pipe 2 is then rotated with respect to pipe coupling 3 or pipe coupling 3 is rotated with respect to pipe 2 and front face 13 is pressed with a certain force against groove bottom 12, an increased temperature is produced between front face 13 and groove bottom 12 due to the friction occurring thereby. The temperature increases so much that pipe 2 and pipe coupling 3 are then welded to one another in the region of groove bottom 12.

Several through openings (or windows) 14, 14' are provided in radially outer wall 7 distributed in the circumferential direction, through which openings 14, 14' groove 6 is connected to the surroundings of pipe coupling 3. It is shown that openings 14, 14' are embodied or formed in radially outer wall 7. However, it is also possible for openings 14, 14' to be embodied or formed in radially inner wall 8, although the embodiment in radially outer wall 7 is preferred. It is also possible for openings 14, 14' to be embodied or formed in both walls 7, 8.

It is clearly discernible that at least the opening 14' shown on the left in the FIGURE overlaps the weld region between the pipe 2 and the pipe coupling 3, namely the connection between the groove bottom 12 and the front face 13 of the pipe 2. If the opening 14, 14' has a different shape, the opening can also be arranged such that the opening 14, 14' from the weld region between the pipe 2 and the pipe coupling 3 thus penetrates the groove bottom 12 at least in part.

Opening 14, 14' overlaps groove bottom 12 or concludes therewith. This ensures that with a rotation of pipe 2 with respect to pipe coupling 3, air possibly enclosed is always transported to an opening 14, 14' and can escape there.

Opening 14, 14' has a rectangular cross section. The longer side extends approximately parallel to the longitudinal extension of pipe 2 in groove 6. The shorter side extends perpendicular thereto. As is discernible in a comparison of the two openings 14, 14' in the FIGURE, the smallest extension of the cross section of opening 14, that is, the narrow side of opening 14, is greater than or at least as large as the thickness of radially outer wall 7. This thickness defines the length of opening 14'.

This reduces the risk of too much material being melted on during friction welding and of this melted-on material disturbing the friction welding connection. Melted-on material 15 can partially fill opening 14. This is even an advantage because then a mechanical anchoring is obtained between pipe 2 and pipe coupling 3.

The embodiment shown has a number of advantages:

The production of vacuoles is reduced by a defined venting. A targeted discharge of melted-on material that is not required for the weld joint is rendered possible. A mechanical anchoring is possible if opening 14 is deliberately filled with melted-on material 15.

Furthermore, opening 14 forms a good weld indicator. Weld processes that are set up incorrectly can be visually recognized directly on the component, without a destructive test being necessary. This also applies to welded connections that are inadmissibly short.

Finally, it is also possible to use the opening for an automatic inquiry, for example, by a depth measurement, for subsequent processes.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A pipe arrangement comprising:
    a pipe;
    a pipe coupling having on a front face a peripheral groove with a groove bottom, the pipe being inserted within the groove and a weld formed by friction welding is located between the pipe and the groove bottom of the pipe coupling;
    at least one window structured and arranged to connect the groove to the surroundings of the pipe coupling; and
    a radially inner wall and a radially outer wall arranged to form the groove,
    wherein an edge of the at least one window is arranged in a region of the weld between the pipe and the groove bottom of the pipe coupling, the window being sufficiently large to view at least one of the groove, the groove bottom and melted-on material from the weld, such that:
    the at least one window penetrates the groove bottom at least in part, and
    the at least one window is formed in one of the walls.

2. The pipe arrangement according to claim 1, wherein the at least one window is formed in the radially outer wall.

3. The pipe arrangement according to claim 1, wherein the at least one window has a length and a cross section.

4. The pipe arrangement according to claim 3, wherein a smallest extension of the cross section is at least as large as the length of the at least one window.

5. The pipe arrangement according to claim 1, wherein the at least one window has a rectangular cross section.

6. The pipe arrangement according to claim 5, wherein a longitudinal extension of the rectangular cross section is aligned parallel to a longitudinal extension of the pipe in the groove.

7. The pipe arrangement according to claim 1, wherein the at least one window is filled at least in part with the melted-on material.

8. A method of forming the pipe arrangement according to claim 1, comprising:
    inserting the pipe into the groove formed in the front face of the pipe coupling up to the groove bottom;
    rotating the pipe in the groove and along the groove bottom relative to the pipe coupling to form a friction weld connection on the groove bottom to weld the pipe and pipe coupling together; and
    allowing air trapped between the pipe and the groove to escape through at least one window in the pipe coupling communicating with the groove,
    whereby the at least one window, which is sufficiently large to view at least one of the groove, the groove bottom and melted-on material from the weld, penetrates the groove bottom at least in part and is formed in one of the walls.

9. The method according to claim 8, further comprising viewing the proper seating of the pipe against the groove bottom through the at least one window.

10. The method according to claim 8, further comprising viewing the weld between the pipe and the pipe coupling through the at least one window.

11. The method according to claim 8, further comprising mechanically anchoring the pipe and pipe coupling by at least partially filling the at least one window with melted material.

12. The pipe coupling according to claim 1, wherein the inner annular wall extends beyond the outer annular wall to form a pipe connection.

* * * * *